United States Patent [19]

Nakaguchi

[11] Patent Number: 5,479,651
[45] Date of Patent: Dec. 26, 1995

[54] DISC DRIVE CONTROLLER TO DETECT DEFECTS IN READ/WRITE CIRCUITS FOR A DISC DRIVE

[75] Inventor: Yukimi Nakaguchi, Wyomissing, Pa.

[73] Assignees: Fujitsu Limited, Kawasaki; Fujitsu VLSI Limited, Kasugai, both of Japan

[21] Appl. No.: 204,494

[22] Filed: Mar. 2, 1994

[30] Foreign Application Priority Data

Mar. 24, 1993 [JP] Japan ................................. 5-065676

[51] Int. Cl.⁶ .................................................. G06F 11/00
[52] U.S. Cl. .................................. 395/182.03; 371/47.1
[58] Field of Search ........................... 395/575; 371/47.1, 371/67.1, 48; 369/58, 54

[56] References Cited

U.S. PATENT DOCUMENTS

| | | | |
|---|---|---|---|
| 4,758,902 | 7/1988 | Okamoto et al. | 371/38.1 |
| 4,849,956 | 7/1989 | Aizawa | 369/58 |
| 4,920,528 | 4/1990 | Sakamoto et al. | 369/54 |
| 5,335,215 | 8/1994 | Yoshiyama | 369/54 |
| 5,351,227 | 9/1994 | Ichikawa et al. | 369/58 |
| 5,371,745 | 12/1994 | Kiyonaga et al. | 371/13 |

*Primary Examiner*—Hoa T. Nguyen
*Attorney, Agent, or Firm*—Staas & Halsey

[57] ABSTRACT

A disc drive controller for controlling the transfer of data between a computer and a disc drive wherein it is possible to detect errors produced by the controller occurring in the writing or reading of data respectively to and from a disc drive. Error detection occurs according to the detection of data modulated by a write data circuit or the lack thereof.

31 Claims, 11 Drawing Sheets

5,479,651

DISC DRIVE CONTROLLER TO DETECT DEFECTS IN READ/WRITE CIRCUITS FOR A DISC DRIVE

BACKGROUND OF THE INVENTION

1. Field of the Invention

The present invention relates generally to a disc drive controller which controls the input and output of digital data to and from an optical or magnetic disc drive. The controller determines whether an error has occurred in the input and output of the data to the disc drive according to detection of data encoded with a Run Length Limited code and a synchronized pattern.

2. Description of the Related Art

FIG. 1 shows a conventional data processing device in which an optical disc is used as the main source for storing data. The controller includes a disc controller 110, a micro processing unit (hereinafter referred to as MPU) 113, a dynamic random access memory (hereinafter referred to as DRAM) 114 as an external memory, an optical disc 118 and a disc drive 200. The disc drive 200 responds to the disc controller's data input and output (I/O) instructions by performing operations such as the reading and writing of data respectively to and from the disc 118, according to a particular modulated digital code.

The job of a controller is to control and handle the bus access for the I/O devices coupled to the computer 119. When a program wants data from an I/O device, it causes a demand to be given to the disc controller, which then issues seek and other commands to the drive. When a particular track and sector on the storage medium has been located by the drive, the drive begins outputting the data as a serial bit stream to the controller. It is the job of the controller to break the bit stream up into words, and write each word into to a particular memory, as it is assembled.

FIG. 6 is illustrative of a sector of formatted binary data, i.e., the smallest contiguous binary sequence used in the transfer of data to and from a storage medium, such as the disc 118. A sector 80 includes a fixed length address field 81 and a fixed length data field 82. A variable frequency oscillator pattern (hereinafter referred to as VFO) 83 and a SYNC pattern 84 are stored in the data field 82. Following the SYNC pattern 84, a run length limited code data (hereinafter referred to as RLL) 85 is stored in the data field 82. This RLL code represents the limited number of continuous binary zeros (i.e., "0's") that are disposed between binary ones (i.e., "1's"). Specifically, RLL encoding maps the maximum and minimum spaces occurring between consecutive transitions in a binary waveform to maximum and minimum run lengths of 0's occurring between two consecutive 1's in the respective encoded binary sequence.

The RLL encoded data 85 in FIG. 6 is formed with fifteen bytes. Subsequent in placement to the RLL encoded data 85, a RESYNC pattern 86 is stored in the data field 82. RLL encoded data 85 and RESYNC pattern 86 are continuously and alternatingly stored in the data field 82. A post amble pattern (hereinafter referred to as PA) 87 is stored at the very end of the data field.

As FIG. 1 further illustrates, the design of a conventional controller 110 includes a buffering circuit 111 and a formatter 112. These components are usually found integrated on a single chip, with the buffering circuit 111 communicatively coupled to the computer 119, MPU 113 and DRAM 114. Such a design allows the buffering circuit 111 to regulate the input and output of digital data to various computer peripherals.

A single control signal, transmitted from the MPU 113 to the buffering circuit 111, effects the parallel transfer of parallel binary data between the DRAM and computer 119. Such binary data is usually transferred in 512 byte segments containing single byte units. Another operation performed by buffering circuit 111 based on a control signal is the parallel transfer of single byte units of binary data between the DRAM 114 and the formatter 112. When the buffering circuit 111 transfers data from the DRAM 114 to the formatter 112, the buffering circuit 111 computes an error correction code in order to correct for errors existing in data with respect to every byte transferred. The computed error correction code is stored in a memory (not shown) disposed in the buffering circuit 111. After the operation for transferring the 512 byte data is completed, the buffering circuit 111 transfers the computed error correction code by a single byte unit.

This data is then stored in DRAM 114, under the control of the buffering circuit 111, at a memory location corresponding to the particular sector of the disc 118 where the data was stored. Buffering circuit 111 performs this operation while at the same time it incorporates error detection circuitry to detect errors occasioned which might have occurred during the data transfer. This correction routine is usually based upon the error correction code incorporated with the transferred data. After the data correction operation, the buffering circuit 111 removes the incorporated error correction code from the read data, and transfers the remaining data to the DRAM 114 in single byte units.

The formatter 112 usually includes a serializer 115, a deserializer 116 and a modulator-demodulator 117. The serializer 115 converts a single byte of data, transferred in parallel under control of the buffering circuit 111, into serial data. The serializer 115 outputs the converted serial data to the modulator-demodulator 117 where the data is then modulated into RLL encoded data. Next, the modulator-demodulator 117 adds the VFO pattern, SYNC pattern and RESYNC pattern, and a post amble pattern to the very end of the RLL encoded data. The modulator-demodulator 117 then outputs the resultant data segment to the optical disc 118 as write-in data (WDATA).

On the other hand, during a reading operation, data is read from the disc 188 as read-out data (RDATA) and transferred by means of the drive 200 to the modulator-demodulator 117. The modulator-demodulator 117 detects and removes any encoded synchronized and post amble patterns present in data RDATA. Following that, the modulator-demodulator 117 demodulates the RLL encoded data into binary serial data, which is output to the deserializer 116. The serial data is then converted by deserializer 116 to parallel data which is output under the control of the buffering circuit 111.

Error correction protocol is a crucial facet of efficient data transfer. Conventional error correction circuitry is typically integrated into the disc controller 110 and operates in the following manner.

A first sample of error encoded read-out RDATA is read from the disc 118 by disc drive 100 under the control of disc controller 110. This first sample of data is transferred to the formatter 112 where the sample's RLL code is demodulated by demodulator 117 and deserialized by deserializer 116 into parallel data. From the formatter 112, this first sample of parallel data, having an error code incorporated therein, is transferred by the buffering circuit to the DRAM 114 for storage. A part of the data stored in the DRAM 114 is then intentionally rewritten. The error encoded binary data is then output to the modulator-demodulator 117, where it is modulated into a respective RLL encoded data. The modulated data is output to the driver 200, and is written in the disc 118 by means of the driver 200. Then, the data is read out from the disc 118 and demodulated by means of the modulator-demodulator 117. The operation for correcting the errors is applied on the read-out data by means of the buffering circuit 111, similar to the normal operation. Only the regular data portion in the corrected data is loaded into the DRAM 114. This loaded data is compared with the data previously stored in the DRAM 114. The testing operation is carried out by finding the position where the errors were stored and by finding how the errors occurred, through the result of this comparison.

However, in the controller 110, the modulator-demodulator 117 removes the annexed synchronized patterns in the read-out data RDATA transmitted from the disc 118. The modulator-demodulator 117 demodulates only the RLL code data that corresponds to the remaining data. The demodulated data is outputted to the buffering circuit 111. Unfortunately, when the data in the disc 118 is not accurately read out, perhaps due to an error spot existing on the disc 118 or in the controller itself, a testing routine for finding out whether the error occurred in the controller 110 or the disc 118 has not as yet been incorporated into the controller.

This is particularly disadvantageous since the modulator-demodulator is responsible for modulating the write-in data WDATA according to various codes and a synchronized pattern. Therefore, when the failure exists in the modulation-demodulation component 117 of the controller 110, it is as yet been impossible to detect.

SUMMARY OF THE INVENTION

It is therefore an object of the present invention to provide a disc drive controller, which can detect the introduction of an error in the data written or read by a disc drive to a disc by providing a data code modulated with a synchronized pattern in the transferred data to simulate a detectable error condition.

It is another object of the present invention to provide a disc drive controller, which can detect an error in the modulation or demodulation of data provided to or from the disc respectively by detecting data encoded with a synchronized pattern.

To achieve the forgoing objectives according to the present invention, a disc drive controller for controlling the transfer of data between a computer and a disc drive controls the transfer of data between a computer and a disc drive by detecting the occurrence of error produced in the controller's writing or reading of data respectively to or from the disc drive. The controller comprises a means for buffering data transferred between the controller and disc drive, a means for producing control signals to the controller, and a means for storing data transferred by the controller. Data is written to a disc drive by a writing means comprising means for converting parallel data to serial data modulated with a Run Length Limited code and with a synchronized signal. In response to a test control signal, the writing means writes unmodulated serial data to the disc drive. The controller further includes means for reading serial data from a disc and means for converting the serial data into parallel data. The reading means comprises means for decoding the Run Length Limited code and synchronized pattern as well as means for producing parallel data containing the Run Length Limited code and synchronized/pattern. In response to a test control signal, the writing means outputs a modulated signal to the disc drive which is read and converted into parallel modulated data by the reading means. A defect detecting means detects errors in the writing means in response to a control signal wherein modulated data, written by the writing means to the disc drive, is read by the reading means without being demodulated and is then compared to a predetermined value stored by the computer. Means for detecting the occurrence of a defect in the reading means are provided when unmodulated data written to the disc is detected as having been demodulated by the reading means.

BRIEF DESCRIPTION OF THE DRAWINGS

The features of the present invention that are believed to be novel are set forth with particularity in the appended claims. The invention, together with objects and advantages thereof, may best be understood by reference to the following description of the preferred embodiments together with the accompanying drawings, in which:

DESCRIPTION OF THE PREFERRED EMBODIMENT

A preferred embodiment of the present invention will now be described according to FIGS. 2 through 11.

Figure 1:
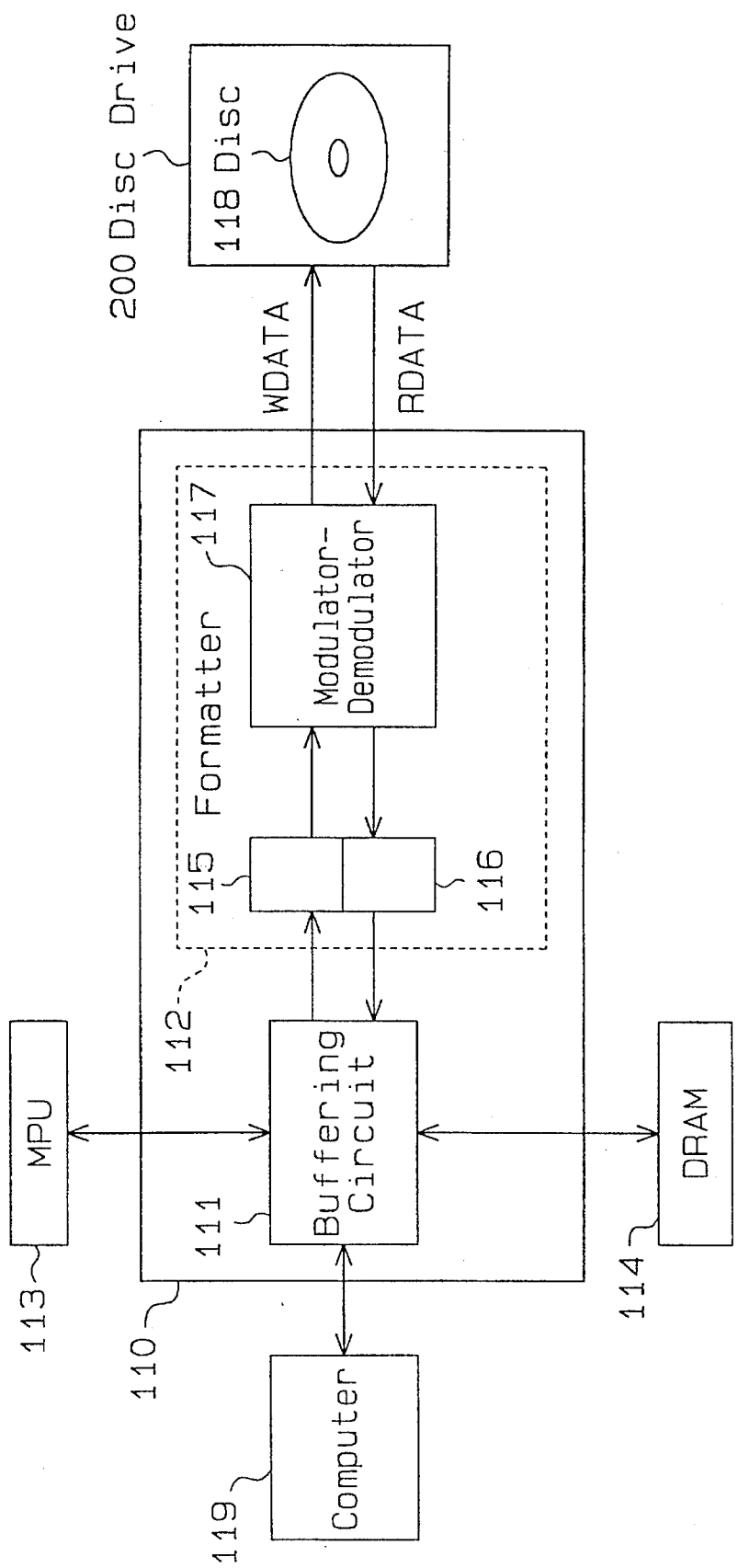
FIG. 1 is a schematic view of a conventional data processing device.
Figure 2:
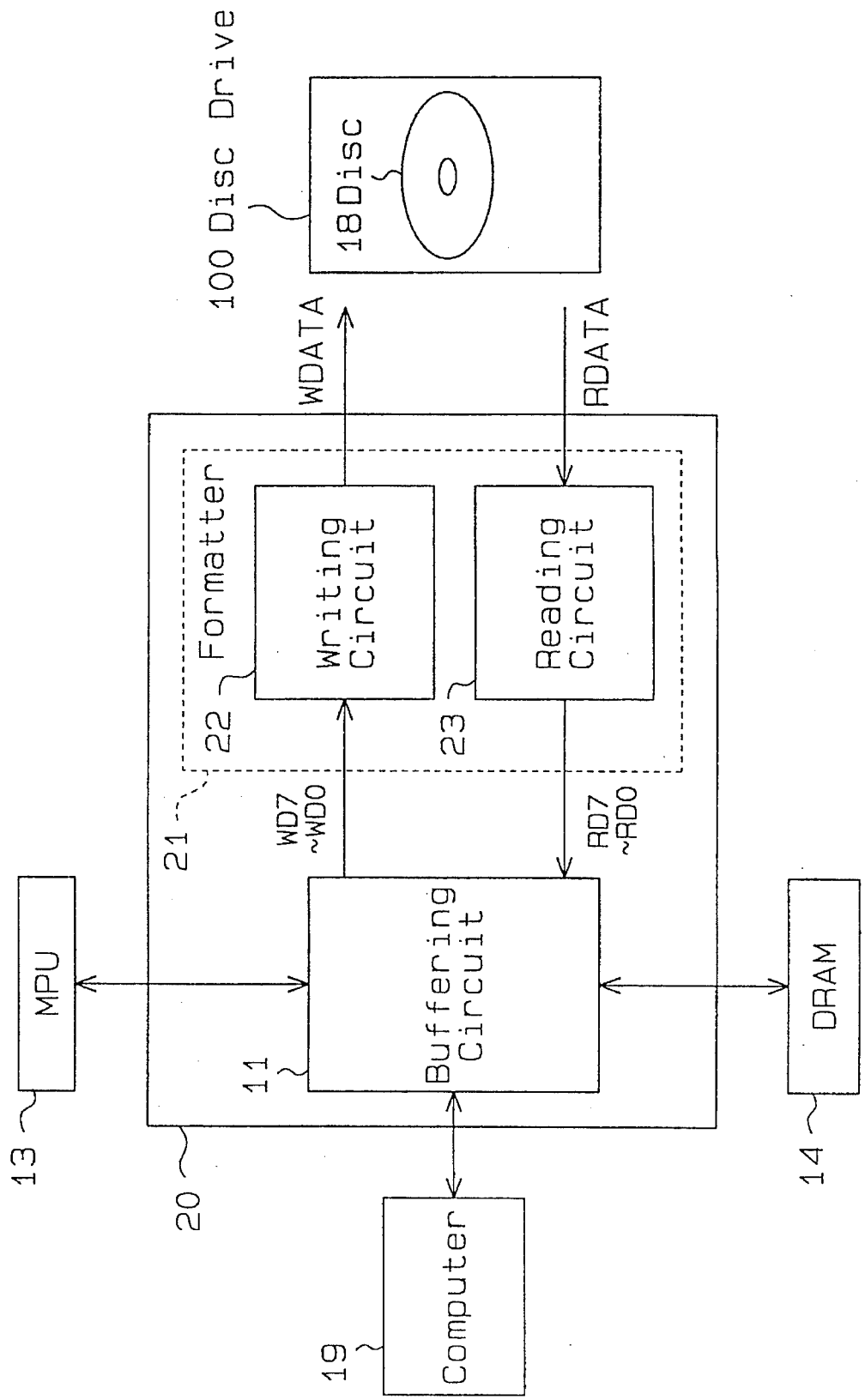
FIG. 2 is a schematic view of a data processing device according to a preferred embodiment of the present invention.
Figure 6:
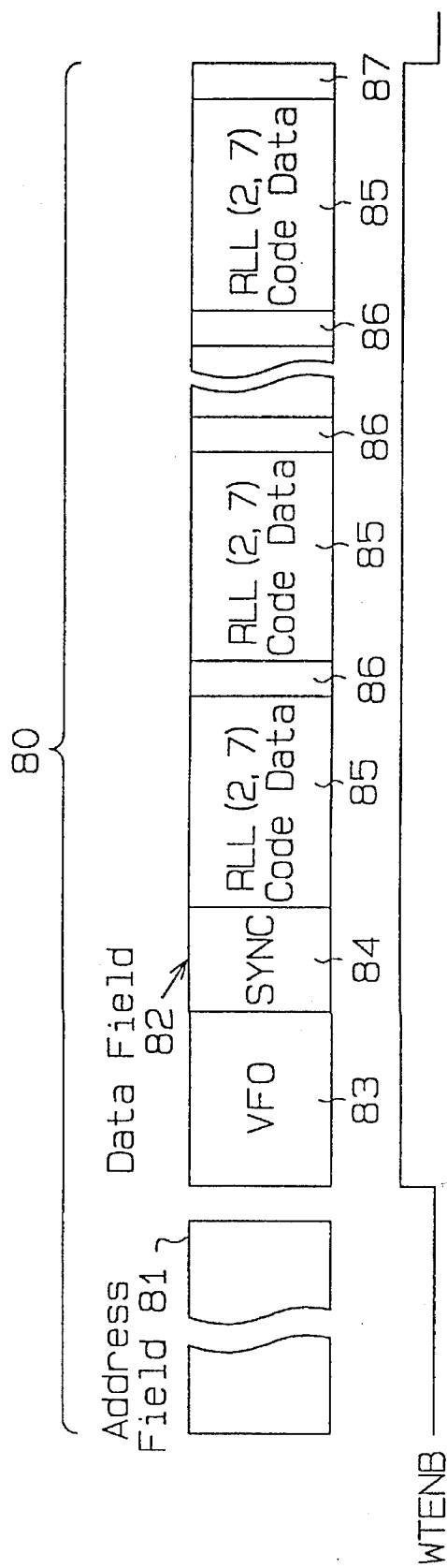
FIG. 6 is a timing chart that illustrates the content of data written to the disc drive by the writing means.

FIG. 2 is a schematic view of a data processing device according to the preferred embodiment. The data processing device includes a disc drive controller 20, a MPU 13, a DRAM 14 as an external memory, a command computer 19, an optical disc 18 and a disc drive 100. The drive 100 performs operations for writing data to the disc 18 or for reading out data from the disc 18. The sector format operation in the disc 18 is indicated in FIG. 6, similar to that in the conventional disc 118.

The controller 20 includes a buffering circuit 11 and a formatter 21, both of which may be, but need not be, integrated on a single chip. The buffering circuit 11 couples the computer 19 to the MPU 13 and DRAM 14, and effects the overall control of data transmission between the computer 19, the DRAM 14, the MPU 13 and disc drive 100. According to the present embodiment, buffering circuit 11 incorporates buffering circuitry as well as a code detection circuit for detecting the occurrence of a particular data code.

The buffering circuit 11 performs the parallel transfer of binary data between the DRAM 14 and the computer 19, in single byte eight bit units based on 512 byte segments. In response to another control signal, the buffering circuit 11 performs the parallel transfer of binary coded write-in data WD7 through WD0, and binary coded read-out data RD7 through RD0 between the DRAM 14 and formatter 21. During these particular transfers, the buffering circuit 11 computes an error correction code with respect to every byte of data transferred. The error correction code is first stored in a memory (not shown) disposed in the buffering circuit 11, and second, following the 512 byte data transfer, the buffering circuit 11 transfers an error correction code in a single byte unit.

When the buffering circuit 11 effects the parallel transfer of data from the formatter 21 to the DRAM 14, the buffering circuit 11 stores in memory, data corresponding to a single sector of data on the disc 18. Using the error encoded data, i.e., data plus an error code, the buffering circuit 11 performs an error correction routine to eliminate errors which might have been introduced to the data during its transfer. Following this routine, the buffering circuit 11 removes any error correction code from the read-out data. Then, the buffering circuit 11 then transfers the remaining data to the DRAM 14 in single byte units.

The formatter 21 includes a means for writing data 22 and a means for reading data provided by a disc drive 100. Data WD7 through WD0 are inputted to the writing circuit 22 which either produces serialized modulated data or serial unmodulated data. Modulation of the data occurs according to when the inputted data WD7 through WD0 is encoded into respective RLL codes (2, 7). This produces write-in data WDATA with respect to the disc 18. The RLL, according to this embodiment is an RLL (2, 7) code which limits the number of successively continued binary data "0"'s to the minimum number of 2 and the maximum number of 7. The reading circuit 23 outputs respective data RDATA read out from the disc 18 to the buffering circuit 11 as the respective read-out data RD7 through RD0.

The writing circuit 22 includes a modulator and a circuit for bypassing the modulation. The for reading circuit 23 includes a demodulator circuit and a read bypass circuit. Writing circuit 22 receives written data WD7 through WD0 which it converts to serial data. Writing circuit 22 then modulates the serial data to RLL (2,7) code and adds a synchronized pattern. This data then gets written out to disc 18 via disc drive 100. Depending on the presence of a control signal from the MPU 13, the writing circuit outputs only serial unmodulated data to the disc.

The reading circuit 23 is provided in controller 20 and reads the serial data RDATA provided by the disc drive 100. Reading circuit 23 is provided with circuit for demodulating the synchronized pattern and RLL code and a first and second circuit for converting the serial data into parallel data. Reading circuit 23 is coupled with a buffering circuit 11 to output serial data that is either processed with a demodulator or which bypasses the demodulating means. Thus the reading circuit 23 outputs parallel data RD through RD0 having been demodulated or without having been demodulated.

Figure 3:
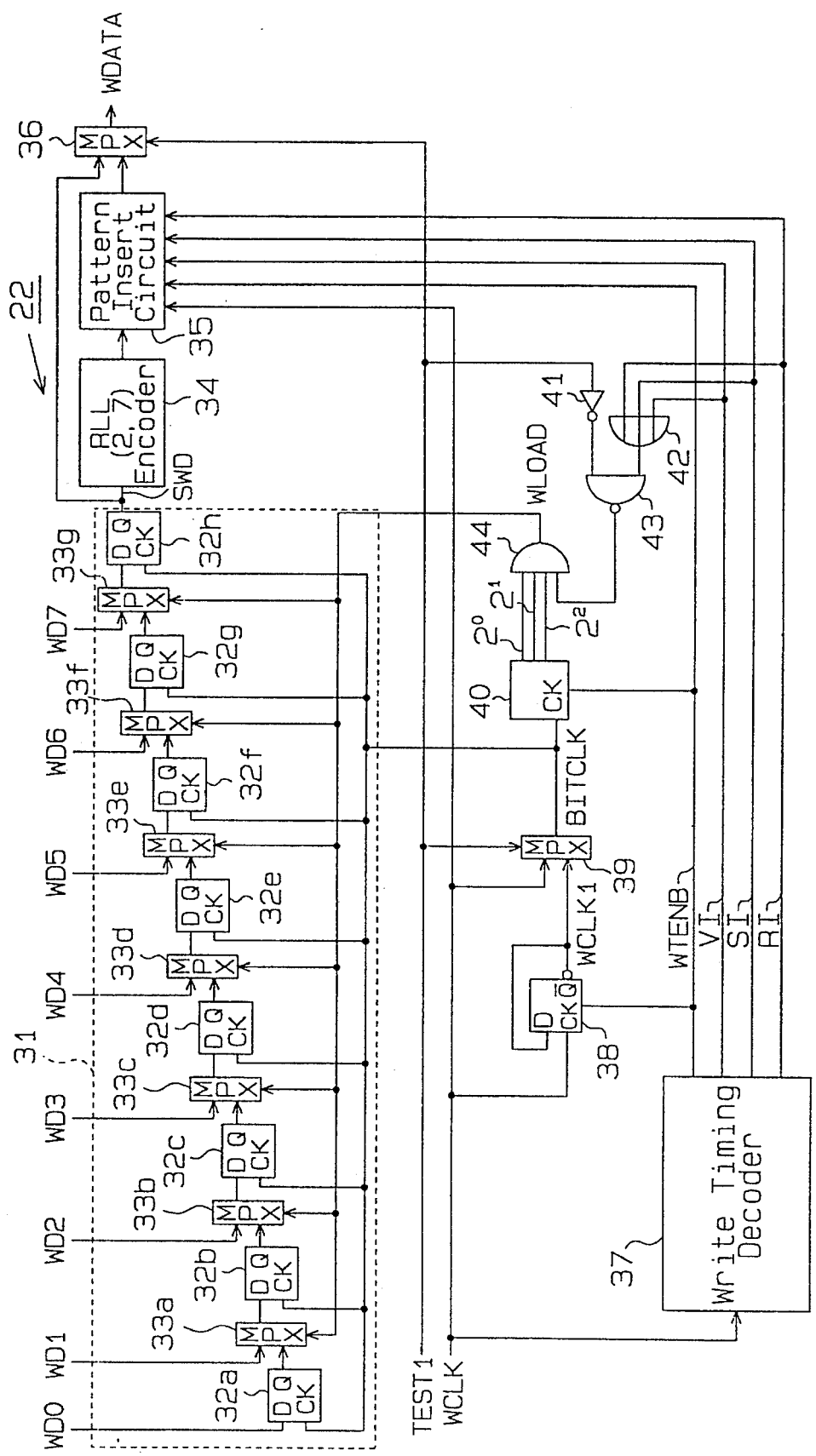
FIG. 3 is a circuit diagram for illustrating the circuit for writing data to a disc drive as a component of the controller in FIG. 2.

FIG. 3 shows in detail the writing circuit 22 for writing the data input to a disc drive 100.

A write timing decoder 37 inputs write-in clock WCLK from the drive 100 as shown in FIG. 2. The decoder 37 outputs a high (H) level write enable signal WTENB to a pattern insert circuit 35, a divider 38 and a counter 40, during the period when data is being written to the disc drive 100. After the decoder 37 outputs the H level enable signal WTENB, the decoder 37 counts the number of pulses of clock WCLK, during the write-in operation. When the counted value approaches predetermined value, the decoder 37 outputs pattern inserting signals VI, SI, RI to the pattern insert circuit 35 for inserting a respective VFO pattern, a SYNC pattern and a RESYNC pattern as shown in FIG. 6.

The divider 38 is generally formed with a flip flop. A data terminal D of the divider 38 couples with a reverse output terminal bar Q. A clock terminal CK of the divider 38 inputs clock WCLK. When an enable signal WTENB is at a logic low (L) level, the divider 38 is reset, whereby the dividing operation is not carried out. When the signal WTENB is at an H level, the divider 38 divides the frequencies of clock WCLK into a half. The divider 38 outputs a divided signal WCLK1 to a multiplexer 39.

The multiplexer 39 receives as inputs a clock signal WCLK, a divided signal WCKL1 and a test signal TEST1. The test signal TEST1 goes high during the test writing period, but otherwise, logically low during the normal write-in mode. If a test signal TEST1 is high, the multiplexer 39 selects the clock WCLK, and outputs the selected signal to the counter 40 and serializer 31 as a respective write-in clock signal BITCLK. If a test signal TEST1 is low, the multiplexer 39 selects the divided signal WCLK1 and outputs it to the counter 40 and serializer 31 as a respective clock signal BITCLK.

The counter 40 is formed with an octal notation counter that repeatedly counts from "0" through "7". If an enable signal WTENB is low, the counter 40 is reset and does not count the number of pulses provided by the clock signal BITCLK. If an enable signal WTENB is high, the counter 40 counts the number of pulses provided by the clock signal BITCLK. The counter 40 then outputs the counted pulse value to an AND gate 44, via signal lines $2^2$ through $2^0$.

An OR gate 42 inputs the insert patterns VI, SI, RI, respectively. A NAND gate 43 receives the signal from the OR gate 42, and a test signal TEST1, via a NOT gate 41.

The AND gate 44 inputs a counted value by means of the counter 40 and the output of the NAND gate 43. The AND gate 44 outputs a load signals WLOAD, based upon these input signal.

Therefore, the test signal TEST1 goes low during the normal write-in mode. At this time, if the counted value by the counter is equal to "7", and all pattern insert signals VI, SI, RI are at an L level, respectively, the output signal from the NAND gate 43 goes high. Consequently, the load signal WLOAD goes high. Further, a test signal TEST1 goes high when the operation for test writing is carried out. At this time, the output from the NAND gate 43 is always high. Consequently, a load signal WLOAD goes high every time the counted value by the counter 40 becomes equal to "7". The serializer 31 is formed with eight flip-flops (hereinafter referred to as FF) 32a through 32h and seven multiplexers 33a through 33g. Clock terminals CK of the FF's 32a through 32h are coupled with the clock BITCLK, respectively. FF 32a inputs a write-in data WD0 through a data terminal D thereof.

The multiplexers 33a through 33g input data WD1 through WD7, via input terminals disposed at one side thereof, respectively. Input terminals disposed at the other side of the multiplexers 33a through 33g couple with output terminals Q of the FF's 32a through 32g, respectively. Output terminals of the multiplexers 33a through 33g couple with data terminals D of the multiplexers 33a through 33g, respectively. The multiplexers 33a through 33g input a load signal WLOAD, respectively. If a load signal WLOAD is at an H level, the multiplexers 33a through 33g select data WD1 through WD7, and output the selected data WD1 through WD7, respectively. If a load signal WLOAD is at an L level, the multiplexers 33a through 33g select the outputs from the FF's 33a through 33g, and output the selected outputs, respectively.

Accordingly, serial data can be output as WDATA, produced by means for serializing parallel data 31, without having any modulation performed on the data. This data enables the use of a detecting circuit 19, such as a computer, to detect whether an error has occurred in the writing of data to the disc drive 100 from the controller 20.

Therefore, if a load signal WLOAD is at an H level, as the pulses of the clock BITCLK are inputted, the data WD0 through WD7 are simultaneously latched to the FF's 32a through 32h, respectively. If a load signal WLOAD is at an L level, the data stored in the FF's 32a through 32h are sequentially shifted rightward every time when the pulses of the clock BITCLK are inputted thereto. The serializer 31 converts parallel data WD7 through WD0 into a respective serial data SWD, and the converted data SWD is outputted to a RLL encoder 34. The encoder 34 sequentially inputs the data SWD. The encoder 34 modulates the data SWD into a respective RLL (2, 7) code data. The encoder 34 outputs the modulated RLL (2, 7) code data to the insert circuit 35. This RLL (2, 7) code data has a sixteen bit channel, that is equal to the double of eight bit data SWD.

The insert signals VI, SI, RI are inputted to the insert circuit 35, respectively. When all the insert signals VI, SI, RI are at an L level, the insert circuit 35 outputs RLL code data 85 shown in FIG. 6 to a multiplexer 36, without applying any change. If an insert signal VI is at an H level, the insert circuit 35 inserts the VFO pattern 83. If an insert signal S is at an H level, the insert circuit 35 inserts the SYNC pattern 84 to the position right after the VFO pattern 83. The insert circuit 35 inserts the RESYNC pattern 86 in the position right after the RLL code data 85 every time when the insert signal R having an H level is inputted. Further, the insert circuit 35 inserts the PA 87 to the position right after the last RLL code data 85.

The multiplexer 36 as a first select circuit inputs an output signal transmitted from the insert circuit 35, serial data SWD and a test signal TEST1. If a test signal TEST1 is at an H level (i.e., during test writing), the multiplexer 36 selects data SWD, and outputs the selected data SWD to the disc 18 as write-in data WDATA. If a test signal TEST1 is at an L level (i.e., during normal writing), the multiplexer 36 outputs the output data from the insert circuit 35 as respective data WDATA.

In this way, reading circuit 22 outputs serial data WDATA having been modulated with RLL encoding, a SYNC pattern 84, a RESYNC pattern 86 and a VHO pattern 83. According to the present invention, both the RESYNC pattern 86 and the VHO pattern are considered as various types of synchronized patterns.

Figure 4:
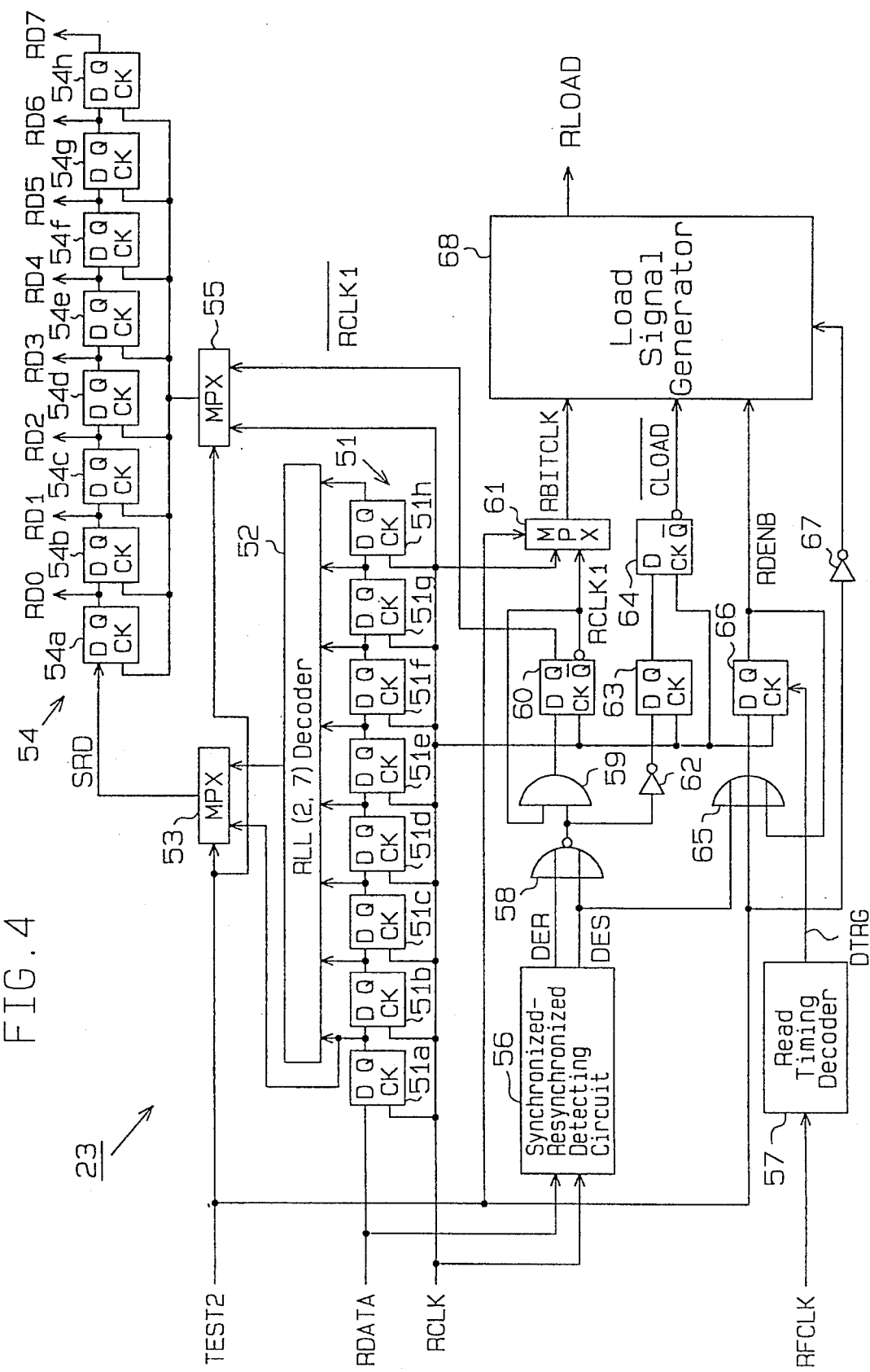
FIG. 4 is a circuit diagram of a circuit for reading data from a disc drive as a component of the controller shown in FIG. 2.
Figure 5:
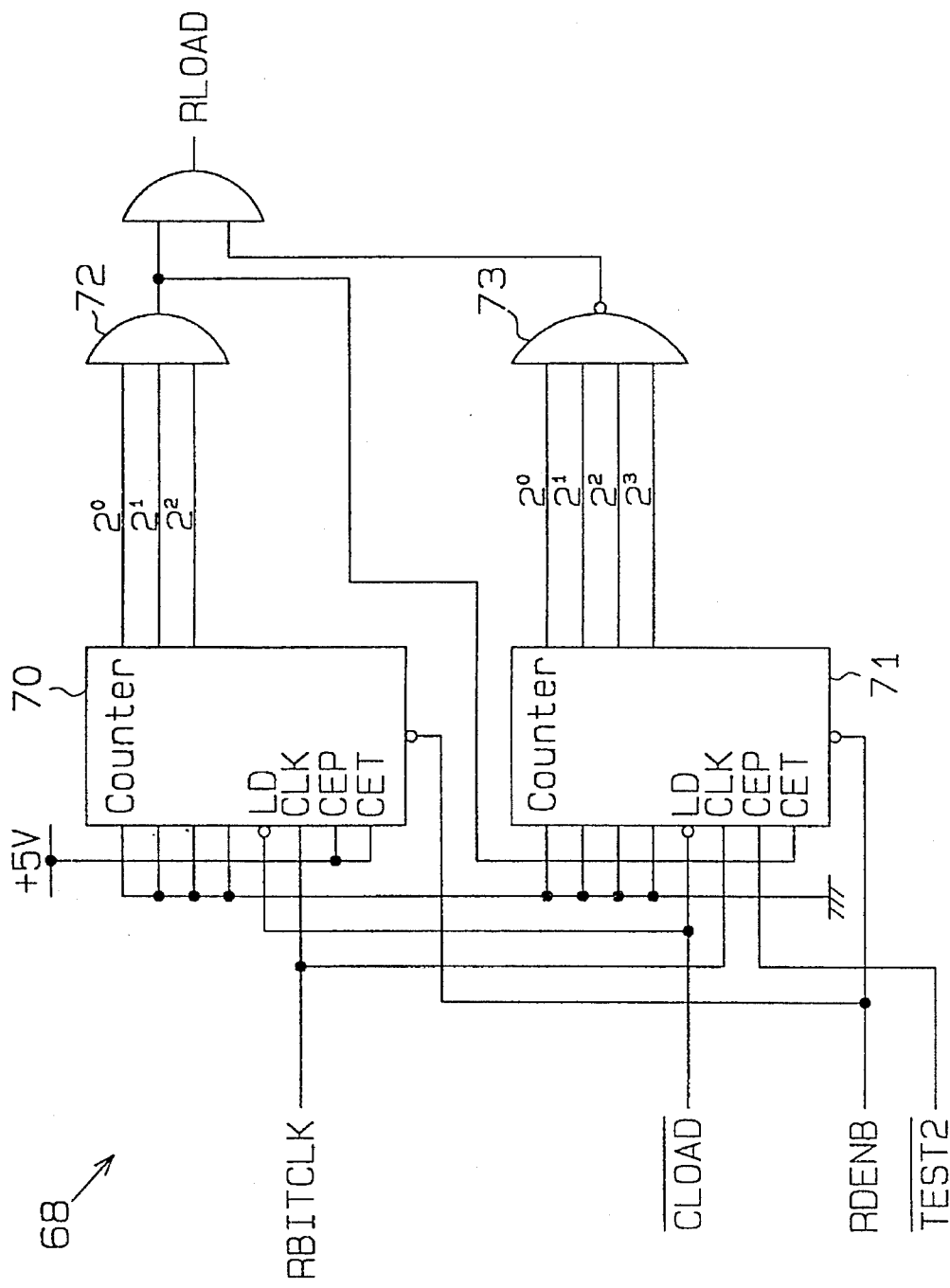
FIG. 5 is a circuit diagram specifically showing a load signal generator in FIG. 4.

FIG. 4 shows a circuit for reading data 23 provided by the disc drive in detail.

Figure 10:
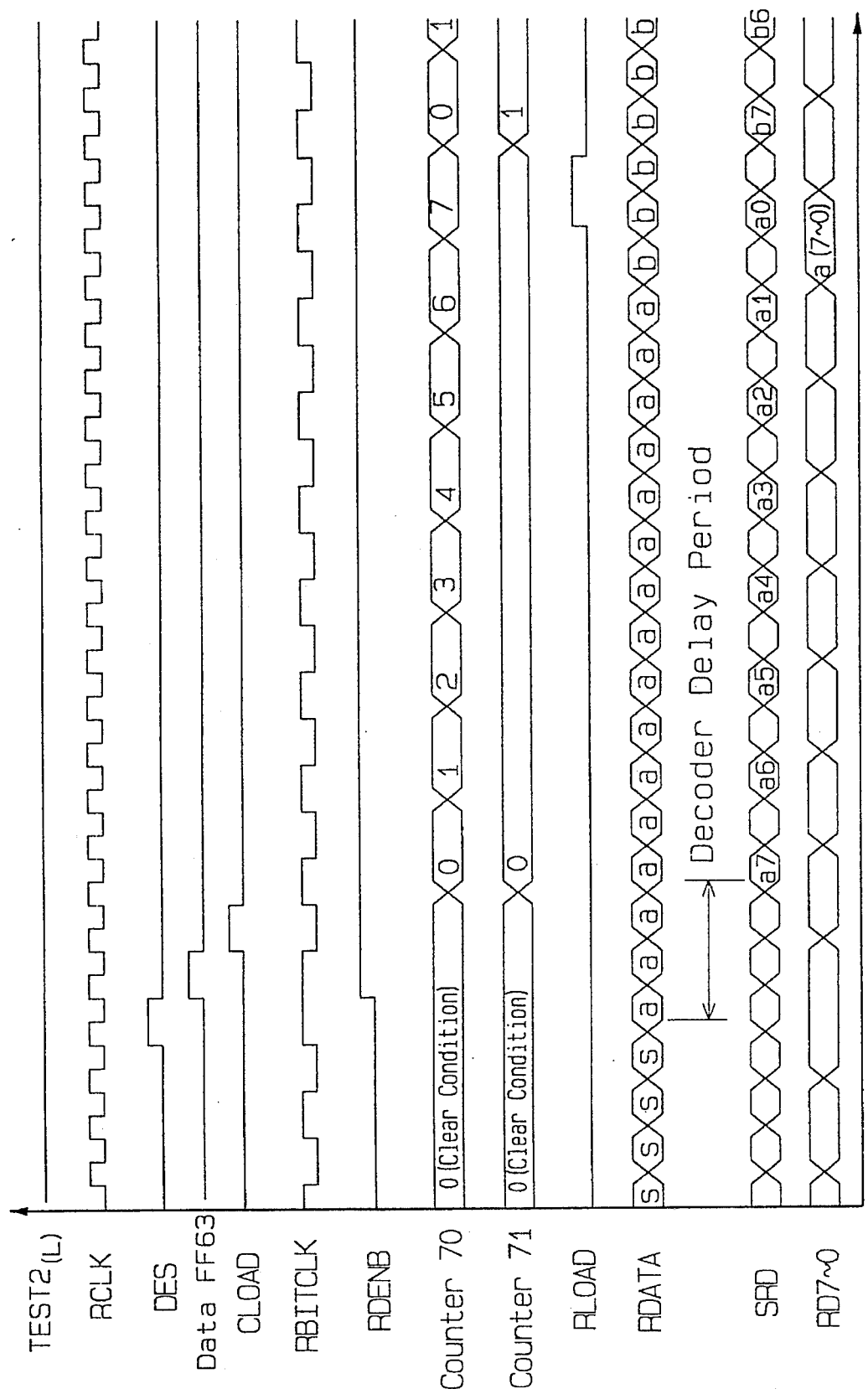
FIG. 10 is a timing chart, showing a normal operation for reading out data that is carried out by means of the data processing device in FIG. 2.

A deserializer 51 is formed with eight FF's 51a through 51h, which are serially connected one after another. The FF's 51a through 51h input clock RCLK as shown in FIG. 10 through clock terminals CK thereof, respectively. The drive 100 outputs clock RCLK (referred to FIG. 2). The FF 51a inputs read-out serial data RDATA that is formed with the RLL (2, 7) code read out from the disc 18, through the data terminal D thereof. The output terminals Q of the FF's 51a through 51g are coupled with the data terminals D of the FF's 51b through 51h, respectively. The output terminal Q of the FF's 51a through 51h are coupled with a RLL decoder 52, respectively. The FF 51a latches a data RDATA in a bit by bit manner, every time the pulses of clock RCLK are inputted. Every time the pulses of the clock RCLK are inputted to the FF's 51a through 51g respectively, the data stored in the FF's 51a through 51g are sequentially shifted to the upper FF's 51b through 51h. Further, the data stored in the FF's 51a through 51h are outputted to the decoder 52.

The RLL decoder 52 demodulates a RLL (2, 7) code data transmitted from the deserializer 51 into respective binary data, based upon the combination of a plurality of bits. The decoder 52 outputs the demodulated data to a multiplexer 53. The RLL (2, 7) code data having a sixteen channel bit length is demodulated into a single byte data having an eight bit binary code.

The multiplexer 53 as a second select circuit inputs an output signal transmitted from the decoder 52 and data RDATA (i.e., output signal transmitted from the FF51a). The multiplexer 53 inputs a test signal TEST2 transmitted from the MPU 13. The test signal TEST2 becomes at an H level during the test read-out operation, and becomes at an L level during the normal read-out mode. If a test signal TEST2 is at an H level, the multiplexer 53 selects data RDATA, and outputs the selected data to a deserializer 54 as a respective serial data SRD. If a test signal TEST2 is at an L level, the multiplexer 53 selects an output signal transmitted from the RLL decoder 52, and outputs the selected data to the deserializer 54 as a respective data SRD.

A synchronized-resynchronized detecting circuit 56 inputs data RDATA and clock RCLK, respectively. The detecting circuit 56 is for detecting a SYNC and RESYNC patterns that are annexed to the data RDATA. When the detecting circuit 56 detects a SYNC pattern 84 (i.e., shown in FIG. 9) from the data RDATA, the circuit 56 outputs a synchronized detection signal DES having an H level as shown in FIG. 10. Further, the detecting circuit 56 detects a RESYNC pattern 86 (i.e., shown in FIG. 9) from the data RDATA, the circuit 56 outputs a resynchronized detection signal DER having an H level.

A NOR gate 58 inputs a synchronized detection signal DES and a resynchronized detection signal DER through two input terminals thereof, respectively. One input terminal of an AND gate 59 is coupled with an output terminal of the NOR gate 58. The other input terminal of the AND gate 59 is coupled with a reverse output terminal bar Q of a divider 60.

The divider 60 is formed with a flip flop. A data terminal D of the divider 60 is coupled with an output terminal of the AND gate 59. The divider 60 inputs clock RCKL through a clock terminal CK thereof. Therefore, when both synchronized detection signal DES and resynchronized detection signal DER are at an L level, i.e., when the SYNC and RESYNC patterns are not detected, the divider 60 divides frequencies of the clock RCLK in half. The divider 60 outputs a divided signal RCLK1 to a multiplexer 61 through the reverse output terminal bar Q. The divider 60 outputs a divided signal bar RCLK1 that is a relative half of the divided signal RCLK1, to a multiplexer 55 through the output terminal Q. When a synchronized detecting signal DES or a resynchronized detecting signal DER is at an H level, i.e., when a SYNC or RESYNC pattern is detected, the divider 60 does not divide clock RCLK.

The multiplexer 61 inputs clock RCLK, a divided signal RCLK1 and a test signal TEST2. If a test signal TEST2 is at an H level (i.e., during the test read-out period), the multiplexer 61 selects clock RCLK, and outputs the selected signal to a load signal generation circuit 68 as a respective read-out clock RBITCLK. If a test signal TEST2 is at an L level (i.e., normal read-out period), the multiplexer 61 selects a divided signal RCLK1, and outputs the selected signal to the load signal generator 68, as a respective clock RBITCLK.

An input terminal of a NOT gate 62 is coupled with an output terminal of the NOR gate 58. A data terminal D of a FF 63 is coupled to an output terminal of the NOT gate 62. An output terminal Q of the FF 64 is coupled with a data terminal D of a FF 64. The FF's 63, 64 form a shift register. The FF's 63, 64 input clock RCLK through clock terminals CK thereof, respectively. The FF 64 outputs a counter load signal bar CLOAD to the load signal generator 68 through a reverse output terminal barQ. Therefore, when a synchronized detection signal DES and a resynchronized detection signal DER are high, a counter load signal bar CLOAD goes low, which is delayed by two pulses of the clock RCLK.

A read timing decoder 57 inputs a reference clock RFCLK from the drive 100 (i.e., shown in FIG. 2). The decoder 67 counts the number of pulses of clock RFCLK. When the counted value reaches a predetermined reference value that is set by means of the MPU 13, the decoder 57 outputs a control signal DTRG having an H level to a FF 66. This predetermined reference value is set by means of the MPU 13 every time when the test write-in or normal write-in operation is carried out.

An OR gate 65 inputs a synchronized detection signal DES and test signal TEST2 through two of three input terminals thereof, respectively. The remaining input terminal of the OR gate 65 is coupled with an output terminal Q of the FF 66.

Figure 11:
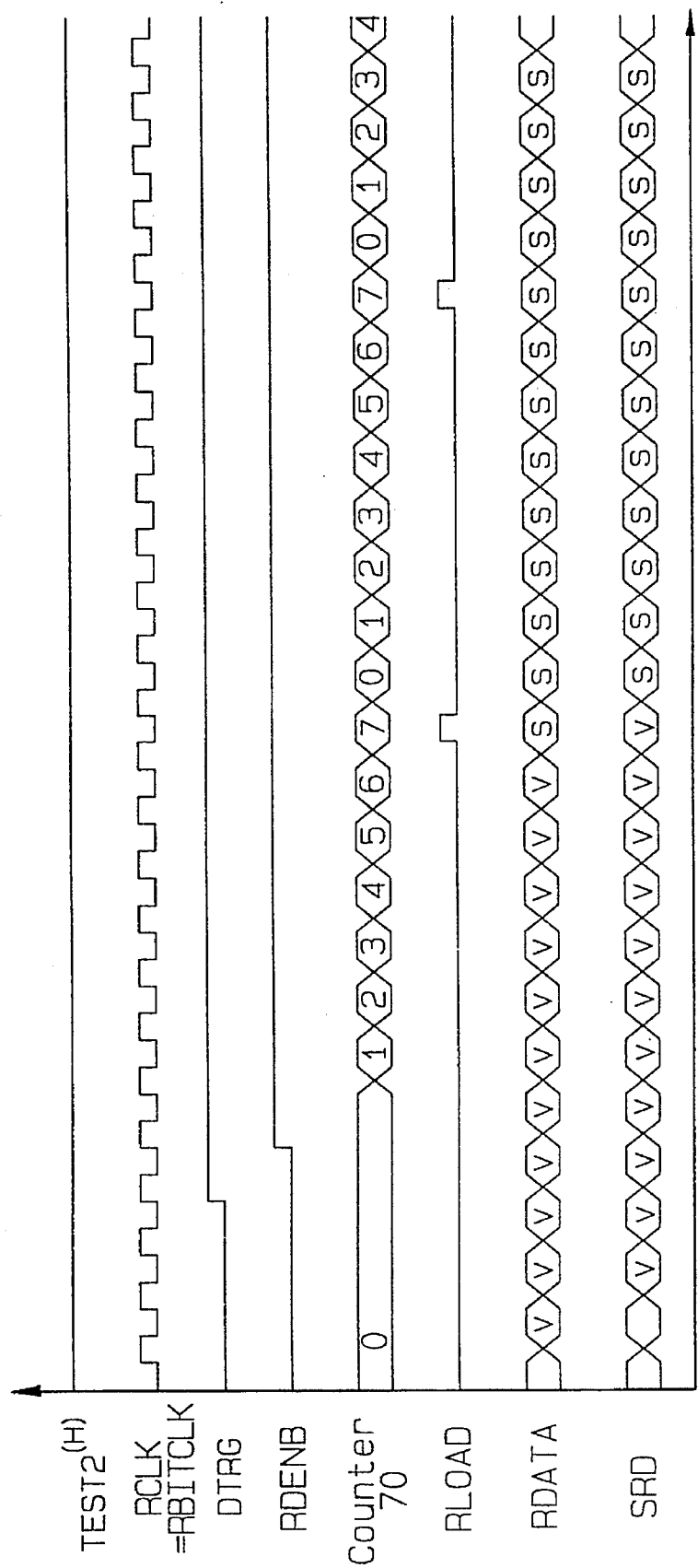
FIG. 11 is a timing chart, showing an operation for reading out data with the by-pass mode that is carried out by the data processing device in FIG. 2.

A data terminal D of the FF 66 is coupled with an output terminal of the OR gate 65. The FF 66 inputs clock RCLK through a clock terminal CK thereof. The FF 66 outputs a read enable signal RDENB to the generator 68 through an output terminal Q. If a control signal DTRG is at an L level, the FF 66 is reset. Therefore, an enable signal RDENB becomes an L level. If a control signal DTRG becomes an H level, the FF 66 synchronizes an output signal transmitted from the OR gate 65 with respect to the pulses of clock RCLK, and stores the synchronized signal, and then outputs it as a respective enable signal RDENB. In other words, if a test signal TEST2 is at an L level (i.e., during normal read-out period), an enable signal RDENB becomes an H level, which is delayed by a single pulse of clock RCLK with respect to a synchronized detection signal DES having an H level, as shown in FIG. 10. Further, if a test signal TEST2 is at an H level (i.e., test read-out period), an enable signal RDENB becomes an H level, which is delayed by a single pulse of clock RCLK with respect to a control signal DTRG, as shown in FIG. 11.

The multiplexer 55 inputs clock RCLK, a divided signal barRCLK1 and a test signal TEST2. If a test signal TEST2 is at an H level (i.e., during test read-out period), the multiplexer 55 selects clock RCLK, and outputs the selected signal to the deserializer 54. If a test signal TEST2 is at an L level (i.e., during normal write-in period), the multiplexer 55 selects a divided signal barRCLK1, and outputs the selected signal to the deserializer 54.

The deserializer 54 is formed with eight FF's 54a through 54h, which are serially sequentially coupled one after another. Clock terminals CK of the FF's 54a through 54h are coupled with the clock terminal CK of the multiplexer 55, respectively. The FF 54a inputs data SRD through the data terminal D thereof. The output terminals Q of the FF's 54a through 54g are coupled with the data terminals D of the FF's 54b through 54h, respectively. Therefore, the FF 54a respectively latches serial data SRD with a bit by bit manner whenever the pulses of either one of clocks (RCLK or barRCLK1) are inputted from the multiplexer 55. Further, whenever the clock is inputted, the data stored in the FF's 54a through 54g are sequentially shifted to the upper FF's 54b through 54h, respectively. In other words, the deserializer 54 converts the read-out serial data into respective parallel data RD7 through RD0, and outputs the converted data to the buffering circuit 11.

The load signal generator 68 includes counters 70, 71, AND gates 72, 74 and a NAND gate 73. The counter 70 is a counter for counting the number of bits from "0+ to "7". The counter 71 is a counter for counting the number of bytes from "0" to "15". Each of the counters 70, 71 inputs an enable signal RDENB. Each of the counters 70, 71 inputs a counter load signal bar CLOAD through load terminals LD thereof, and clock RBITCLK through a clock terminal CLK thereof, respectively. Input terminals CEP, CET of the counter 70 input an H level (i.e., 5 V), respectively. The counter 71 inputs a test signal bar TEST through the input terminal CEP thereof, via a NOT gate 67 (i.e., shown in FIG. 4), and the input terminal CET thereof is coupled with an output terminal of the AND gate 72.

If an enable signal RDENB is at an L level, the counter 70 is reset, whereby the operation for counting the number of pulses of clock BITCLK is not carried out. If an enable signal RDENB is at an H level, a counter load signal bar CLOAD is at an H level. Consequently, the counter 70 counts the number of pulses of clock BITCLK. The counter 70 outputs the counted value to the AND gate 72 through signal lines $2^2$ through $2^0$.

If an enable signal RDENB is at an L level, the counter 71 is reset, whereby the counter 71 does not count the number of pulses of clock BITCLK. If an enable signal RDENB is at an H level, a test signal bar TEST2 is at an H level (i.e., during normal read-out period), and a counter load signal bar CLOAD becomes an H level. Therefore, when an output signal transmitted from the AND gate 72 is at an H level, the counter 71 counts the number of pulses of clock RBITCLK. The counter 71 outputs the counted value to the NAND gate 73 through signal lines $2^3$ through $2^0$. If an enable signal RDENB is at an H level, a test signal bar TEST2 is at an L level (i.e., during test read-out period). Consequently, the counter 71 sets a level of each of signal lines $2^3$ through $2^0$ to "0".

The one input terminal of the AND gate 74 is coupled with an output terminal of the AND gate 72, and the other input terminal thereof is coupled with an output terminal of the NAND gate 73. The AND gate 74 outputs a load signal RELOAD based upon the levels of output signals transmitted from the AND gate 72 and NAND gate 73 respectively, to the buffering circuit 11.

Figure 9:
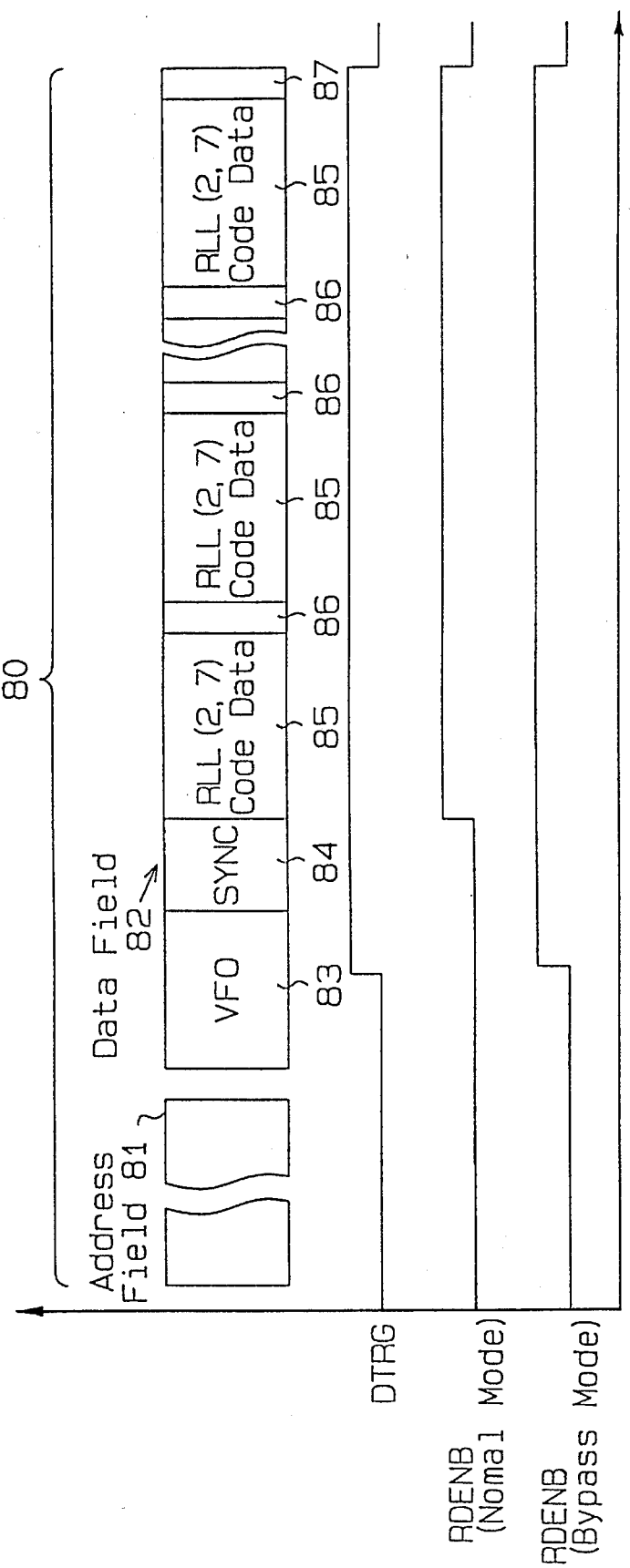
FIG. 9 is a timing chart that illustrates a data structure for data which is read by the reading means.

During the normal read-out operation when a test signal TEST is at an L level, an output signal from the NAND gate 73 may become at an H level if all input signals to the NAND gate 73 are equal to "1". If all input signals to the AND gate 72 are equal to "1", i.e., when the value counted by means of the counter 70 reaches the value equal to "7", an output signal from the AND gate 72 becomes an H level. As a result, a RLL code data 85 as shown in FIG. 9 is loaded into the buffering circuit 11. If all input signals to the NAND gate 73 are equal to "1", i.e., when the value counted by means of the counter 71 reaches the value equal to "15" during the normal read-out period, an output signal transmitted from the NAND gate 73 becomes an L level, and a load signal RELOAD becomes an L level. As a result, a RESYNC pattern 86 and PA 87 are not loaded to the buffering circuit 11.

During a test read-out period when a test signal TEST2 is at an H level, an output signal transmitted from the NAND gate 73 always becomes an H level. Therefore, the NAND gate 72 outputs an output signal having an H level, every time when the value counted by means of the counter 70 reaches the value equal to "7", and a load signal RELOAD becomes an H level. As a result, the VFO pattern 83, SYNC pattern 84, RESYNC pattern 86, PA 87 and RLL code data 85 are loaded into the buffering circuit 11, respectively.

Operations carried out by the controller 20 having the above-described structure will now be described.

Figure 7:
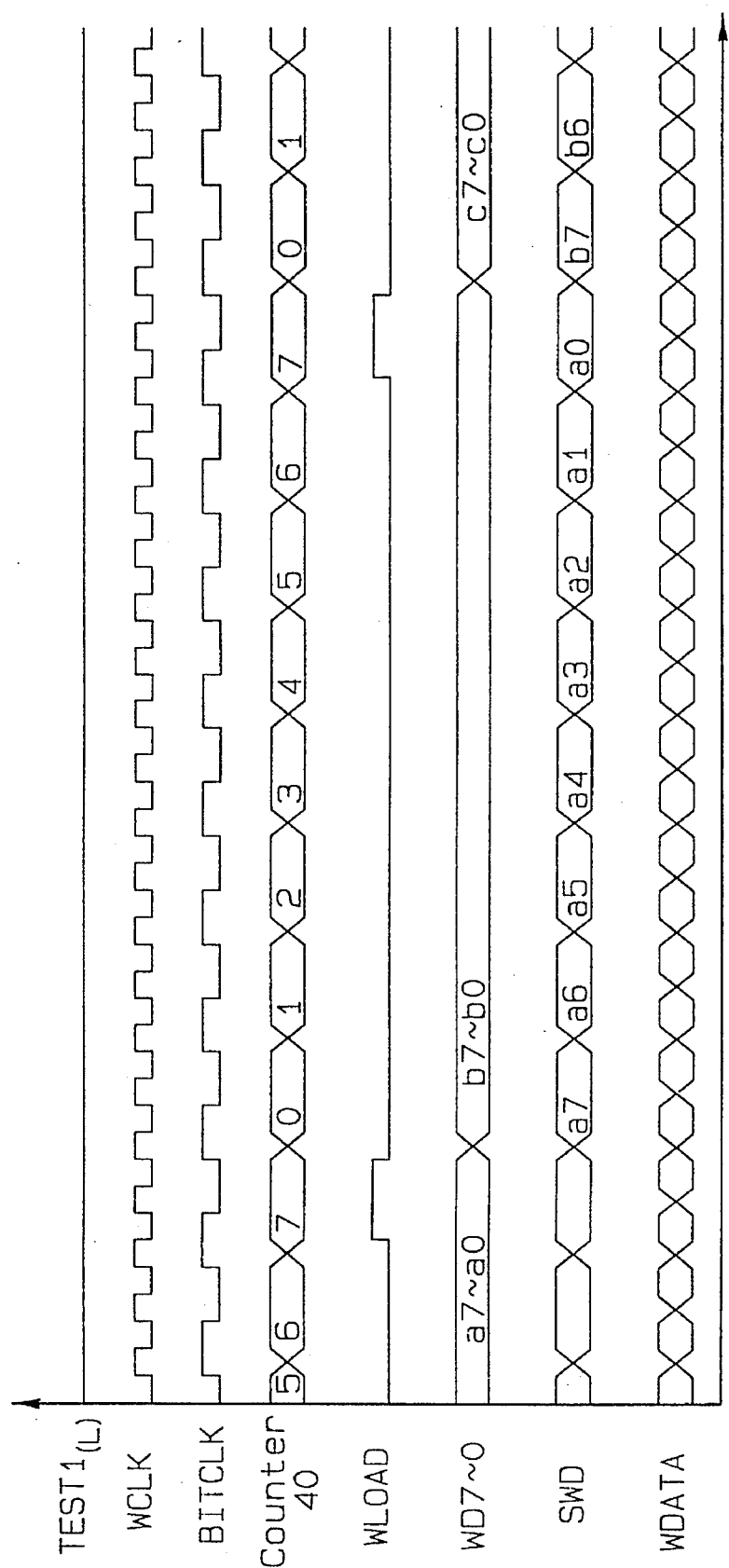
FIG. 7 is a timing chart that indicates a normal operation for writing data that is carried out by means of the data processing device in FIG. 2.

Data to be written in the disc 18 will now be described. As shown in FIG. 7, if a test signal TEST1 becomes an L level, the normal write-in mode operation is to be carried out. The computer 19 transfers binary data formed with a single byte unit to the buffering circuit 11. The data is stored in the DRAM 14 based upon a control signal transmitted from the MPU 13, by means of the buffering circuit 11. The data stored in the DRAM 14 is then transferred to the generator 22 as a single byte unit data WD7 through WD0, based upon the control signal transmitted from the MPU 13, by means of the buffering circuit 11. During the transferring operation, the buffering circuit 11 computes error correction codes with respect to every byte, and the computed error correction codes are stored in the memory (not shown). After the operation for transferring data having 512 bytes is completed, the error correction codes are also transferred by a single byte unit.

The decoder 37 outputs an enable signal WTENB having an H level as shown in FIG. 6, based upon clock WCLK. When the counted value of pulses of clock WCLK reaches a predetermined value after the enable signal WTENB is outputted, the decoder 37 outputs insert signals VI and SI. The insert circuit 35 inserts the VFO pattern 83 and SYNC pattern 84, based upon the insert signals VI and SI.

The divider 38 divides clock WCLK, based upon an enable signal WTENB having an H level. A divided signal WCLK1 that is obtained by dividing clock WCLK in half, is outputted.

At this time, a test signal TEST1 becomes at an L level. Therefore, the multiplexer 39 outputs a divided signal WCLK1 as a clock BITCLK to the counter 40 and serializer 31, as shown in FIG. 7.

Since the enable signal WTENB is at an H level, the counter 40 starts counting the number of pulses of divided signal WCLK1. All insert signals VI, SI, RI are at an L level respectively, and the value counted by means of the counter 40 becomes the value equal to "7", a load signal WLOAD having an H level is outputted. Consequently, the multiplexers 33a through 33g select respective data WD1 through WD7. The FF's 32a through 32h latch data WD0 through WD7, respectively, which are synchronized with the pulses of the divided signal WCLK. The data stored in the FF's 32a through 32h are sequentially shifted rightward, every time when the pulses of a serial data WCLK1 are inputted, and a serial data SWD is outputted to the encoder 34.

The encoder 34 modulates the sequentially inputted serial data SWD thereto into a respective RLL (2, 7) code data. The RLL (2, 7) code data is outputted to the multiplexer 36, via the insert circuit 35. The RESYNC pattern 86 is inserted to the position right after the RLL code data 85 by means of the insert circuit 35 every time when the insert signal R is inputted to the insert circuit 35. Further, the PA 87 is inserted to the position right after the last RLL code data 85 by means of the insert circuit 35.

Since the test signal TEST1 is at an L level, the multiplexer 36 selects an output signal transmitted from the insert circuit 35, and outputs the selected output signal as data WDATA to the disc 18.

Figure 8:
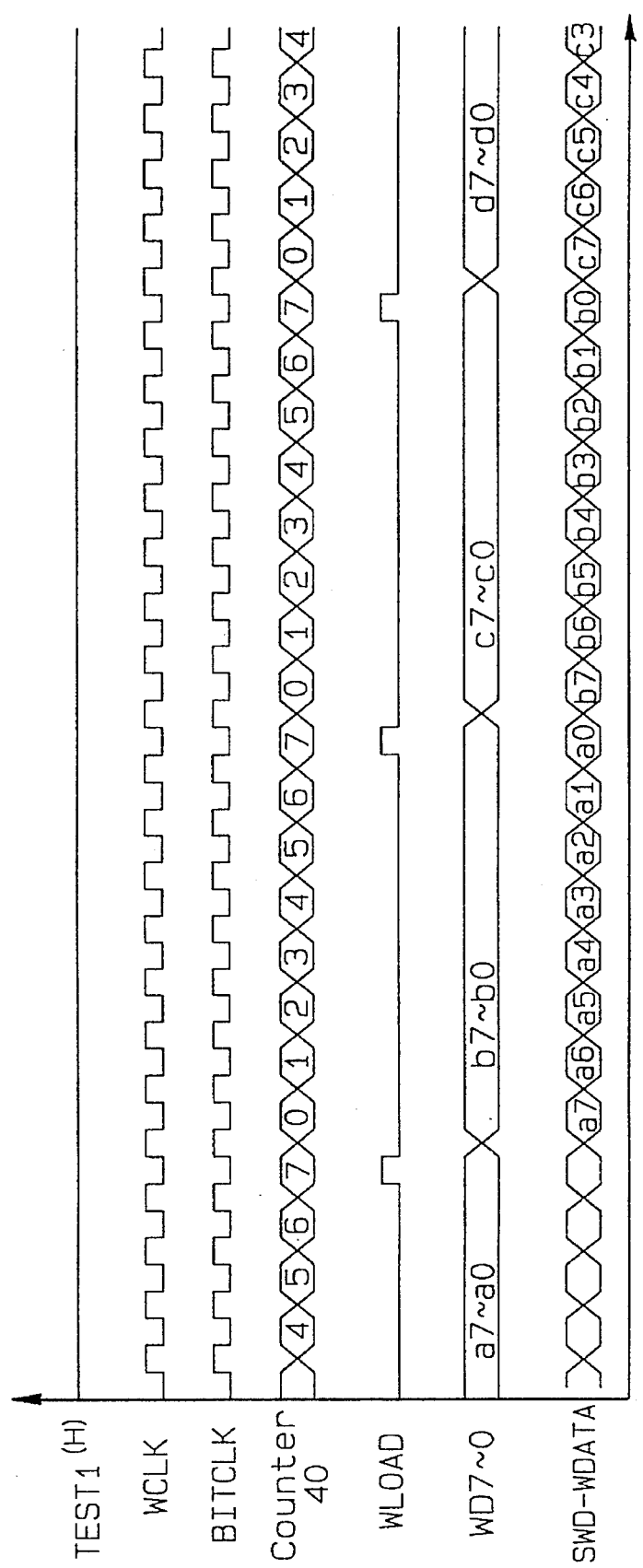
FIG. 8 is a timing chart that indicates an operation for writing data to a disc drive using a by-pass mode, which is carried out by means of the data processing device in FIG. 2.

As shown in FIG. 8, if a test signal TEST1 becomes an H level, the test write-in operation at the by-pass mode is to be carried out. The computer 19 transfers the entire data that are to be stored in the single sector data field 82 (i.e., shown in FIG. 6), such as the VFO pattern 83, SYNC pattern 84, RLL code data 85, RESYNC pattern 86 and PA 87, to the buffering circuit 11. The buffering circuit 11 stores those data into the DRAM 14, based upon a control signal transmitted from the MPU 13.

The buffering circuit 11 transfers the data stored in the DRAM 14 to the generator 22, based upon a control signal transmitted from the MPU 13.

The decoder 37 outputs an enable signal WTENB having an H level as shown in FIG. 6, based upon clock WCLK. At this time, a test signal TEST1 becomes an H level. Therefore, the multiplexer 39 outputs clock WCLK as a clock BITCLK to the counter 40 and serializer 31, as shown in FIG. 8.

Since the enable signal WTENB is at an H level, the counter 40 start counting the number of pulses of clock WCLK. As the test signal TEST1 is at an H level, the NAND gate 43 always outputs an H level signal. Consequently, when the value counted by means of the counter 40 becomes equal to "7", a load signal WLOAD having an H level is outputted. Therefore, the multiplexers 33a through 33g select data WD1 through WD7, respectively. The FF's 32a through 32h latch the data WD0 through WD7 that are synchronized with the pulses of clock WCLK. The data stored in the FF's 32a through 32h are sequentially shifted rightward every time when the pulses of clock WCLK are inputted. As a result, a serial data SWD is outputted.

Since the test signal TEST1 is at an H level, the multiplexer 36 selects an output of the FF 32h, and outputs the selected output as data WDATA to the disc 18.

Operations for reading out data from the disc 18 will now be described. As shown in FIG. 10, when a test signal TEST2 becomes an L level, the read-out operation at a normal mode is carried out. As the MPU 13 sets a predetermined value for the decoder 57, the decoder 57 starts counting the number of pulses of clock RFCLK. When the counted value reaches a predetermined value, the decoder 57 outputs a control signal DTRG having an H level.

The drive 100 sequentially reads out the serial VFO pattern 83, SYNC pattern 84, RLL code pattern 85, RESYNC pattern 86 and PA 87 that are formed with the respective RLL codes, from the disc 18.

Among the read-out data RDATA, the SYNC pattern 84 is detected by the detection circuit 56, as shown in FIG. 9. Therefore, the detection circuit 56 outputs a synchronized detection signal DES. The divider 60 divides clock RCLK. This division is delayed to be carried out by a signal pulse of clock RCLK with respect to the detected signal DES. A half of the divided frequencies of clock RCLK is outputted to the multiplexer 61 as a divided signal RCLK1. A divided signal barRCLK1 is outputted to the multiplexer 55. The read-out enable signal RDENB having an H level is outputted, which is delayed by a single pulse of clock RCLK1 with respect to the detected signal DES. Further, the counter load signal bar CLOAD having an L level is outputted, which is delayed by two pluses of clock RCLK with respect to the detected signal DES.

At this time, the test signal TEST2 is at an L level. Therefore, the multiplexer 61 outputs the divided signal RCLK1 as a respective clock RBITCLK to the generator 68.

The FF 51*a* sequentially latches the data RDATA transmitted from the disc 18 in a bit by bit manner, every time when the deserializer 51 inputs the pluses of clock RCLK. The data stored in the FF's 51*a* through 51*g* are sequentially shifted upward, every time the pluses of clock RCLK are inputted thereto. The data in the FF's 51*a* through 51*h* are outputted to the RLL decoder 52. The RLL decoder 52 demodulates a RLL (2, 7) code data into a respective binary data that is utilized in the computer 19 side, and the demodulated data is outputted to the multiplexer 53. Further, the multiplexer 53 inputs an output transmitted from the FF 51*a*.

At this time, the test signal TEST2 is at an L level. Therefore, the multiplexer 53 selects the output of the RLL decoder 52, and the selected data is outputted to the deserializer 54 as respective data SRD. Further, the multiplexer 55 selects the divided signal barRCLK1, and outputs the selected signal to the deserializer 54.

Therefore, the FF 54*a* sequentially latches the output transmitted from the RLL decoder 52 in a bit by bit manner, every time when the deserializer 54 inputs the pulses of the divided signal barRCLK1. The data in the FF's 54*a* through 54*g* are sequentially shifted upward, every time the pulses of the divided signal barRCLK1 are inputted.

On the other hand, an enable signal RDENB is at an H level, and a test signal bar TEST2 is at an H level. Therefore, the counters 70, 71 start counting the number of pulses of divided signal RCLK1. When the value counted by means of the counter 70 reaches the value equal to "7", a load signal RELOAD becomes an H level, whereby the buffering circuit 11 loads the data RD7 through RD0 stored in the deserializer 54 with a parallel mode.

Further, as the value counted by means of the counter 71 reaches the value equal to "15", a load signal RELOAD becomes an L level. Therefore, as shown in FIG. 9, the buffering circuit 11 does not load the RESYNC pattern 86 and PA 87.

Consequently, the data RD7 through RD0 that are outputted from the reading circuit 23 to the buffering circuit 11 become only data that are formed by demodulating the RLL code data 85 into a respective binary data, as shown in FIG. 9.

When a test signal TEST2 becomes an H level as shown in FIG. 11, the test read-out operation at the by-pass mode is to be carried out. When the MPU 13 sets a predetermined reference value for the decoder 57, the decoder 57 starts counting the number of pluses of clock RFCLK. When the counted value reaches a predetermined reference value, the decoder 57 outputs a control signal DTRG having an H level.

The drive 100 sequentially reads out the VFO pattern 83, SYNC pattern 84, RLL code data 85, RESYNC pattern 86 and PA 87 that are formed with respective RLL codes form the disc 18.

Since the test signal TEST2 is at an H level, an enable signal RDENB is outputted, which is delayed by a single pulse of clock RCLK1 with respect to the control signal DTRG.

At this time, the test signal TEST2 is at an H level. Therefore, clock RCLK as a respective clock RBITCLK is outputted from the multiplexer 61 to the generator 68.

Further, the multiplexer 53 selects data RDATA of the FF 51*a*, and outputs the selected data as respective data SRD to the deserializer 54. Further, the multiplexer 55 selects clock RCLK, and outputs the selected data to the deserializer 54.

Therefore, the FF 51*a* sequentially latches data RDATA in a bit by bit manner, every time when the deserializer 54 inputs the pulses of clock RCLK. The data in the FF 54*a* through 54*g* are sequentially shifted upward to the FF 54*b* through 54*h*, respectively, every time when the pulses of clock RCLK are inputted.

On the other hand, an enable signal RDENB is at an H level, and a test signal bar TEST is at an L level. Consequently, the counter 70 starts counting the number of pulses of clock RCLK. When the value counted by means of the counter 70 reaches the value equal to "7", a load signal RELOAD becomes an H level, whereby the buffering circuit 11 loads the data RD7 though RD0 in the deserializer 54 with a parallel mode. Therefore, the data RD7 though RD0 that are outputted from the reading circuit 23 to the buffering circuit 11 are formed by demodulating the entire data in the data field 82 into respective binary data, as shown in FIG. 9.

Accordingly, in the disc controller 20 of this embodiment, data annexed with synchronized patterns of the VFO pattern 83, SYNC pattern 84, and RESYNC pattern 86, etc. with respect to the RLL code data 85 can be directly written in the disc 18, without through the RLL encoder 34. Therefore, as the data having a partially destructed synchronized pattern is written in the disc 18, it can simulate a condition where the disc 18 includes a failure spot. Then, the data having a partially destructed synchronized pattern is read out from the disc 18, and the read-out data is demodulated by means of the RLL decoder 52. Through this operation, even when the disc 18 includes a destructed synchronized pattern, the testing operation for reading out can be carried out.

Further, in the disc controller 20 according to this embodiment, the synchronized patterns such as the RLL code data 85, VFO pattern 83, SYNC pattern 84 and RESYNC pattern 86, etc. can be directly read out from the disc 18, without through the RLL decoder 52. Therefore, as the synchronized patterns in the read-out data a compared with the regular synchronized patterns, the operation for testing the function carried out by the RLL encoder 34 can be performed, such that the debugging operation for finding out an error portion can be easily carried out.

Further, according to this embodiment, an operation for testing an error correction circuit in the buffering circuit 11 can be carried out, similar to the conventional technology.

Although only one embodiment of the present invention has been described in detail herein, it should be apparent to those skilled in the art that the present invention may be embodied in many other specific forms without departing from the spirit or scope of the invention. Particularly, it should be understood that the following modes are applied.

The disc controller 20 according to this embodiment, the operations for directly writing data into the disc 18 and for directly reading data out from the disc 18 are carried out. It is not limited to this configuration. Either one of the operations for directly writing data into the disc 18 or for directly reading data out from the disc 18 can be independently carried out.

The disc controller 20 according to this embodiment, data is stored in the disc 18 by employing RLL (2, 7) code data. However, for example, RLL (1, 7) code data can be employed as store code data, instead of the RLL (2, 7) code data. RLL (1, 7) code data limits the number of continuous "0"'s existing between two binary "1"'s, to the minimum one and the maximum seven.

Therefore, the present examples and embodiments are to be considered as illustrative and not restrictive and the invention is not to be limited to the details given herein, but may be modified within the scope of the appended claims.

What is claimed is:

1. A disc drive controller for controlling the access of data provided between a disc drive and said controller, said disc drive controller comprising:

a buffer circuit to buffer the data accessed between said disc drive and said controller;

a write circuit, coupled between said buffer circuit and said disc drive to provide data to said disc drive, said write circuit comprising a modulation circuit to modulate the data provided to said disc drive;

a read circuit, coupled between said buffer circuit and said disc drive to read the data provided by said disc drive and to provide said read data to said buffer circuit, said read circuit comprising a demodulation circuit to demodulate the data provided from said disc drive and a read-bypass circuit to provide data from said disc drive without being demodulated; and a defect detecting circuit to detect the occurrence of a defect in said write circuit by comparing data which has been modulated said write circuit, provided to the disc drive and read by said read circuit without being demodulated with a predetermined value.

2. A disc drive controller according to claim 1 wherein said modulation circuit modulates serial data to contain a Run Length Limited code and a synchronized pattern, and wherein said demodulation circuit demodulates data in order to eliminate a Run Length Limited code and a synchronized pattern from the data read by said read circuit.

3. A disc drive controller according to claim 1, wherein said defect detecting circuit further includes a read bypass circuit and a write bypass circuit, said read bypass circuit operating to read bypassed data containing Run Length Limited code and a synchronized pattern from said disc drive and writes the bypassed data to said buffer circuit, said write bypass circuit operating to receive data provided from said buffer circuit and to provide the bypassed data to said disc drive.

4. A disc drive controller according to claim 2 wherein said modulation circuit further comprises:

a serial converting circuit that converts binary coded parallel data provided to said disk drive to serial binary coded data;

a first encoding circuit that encodes said serial binary coded data, provided by said serial converting circuit, with a Run Length Limited code; and a second encoding circuit that adds a synchronized pattern to said Run Length Limited encoded data, provided by said encoding circuit, in accordance with a predetermined frequency, said write circuit operating to provide data modulated by said converting circuit, said first and second encoding circuits.

5. A disc drive controller according to claim 2 wherein said demodulation circuit further includes:

a first read clock generating circuit for providing a first read clock signal;

a clock divider circuit for providing a second read clock signal from said first read signal according to a predetermined frequency;

a control signal generator for generating a control signal;

a first converting circuit that converts serial Run Length Limited encoded data read from said disc drive into parallel Run Length Limited encoded data;

a decoding circuit, coupled to said first converting circuit, that converts the parallel Run Length Limited encoded data provided by said first converting circuit into binary coded serial data;

a second converting circuit, coupled to said decoding circuit, that converts serial data provided by said decoding circuit into parallel data;

data shifting circuit, coupled to said second converting circuit, that eliminates a portion of said parallel data provided by said second converting circuit in response to said first and second read clock signals and control signal provided by said control signal generator.

6. A disc drive controller according to claim 3 wherein said read bypass circuit comprises:

a control signal generator for generating a control signal;

a selection circuit that selectively supplies serial Run Length Limited encoded data provided from said disc drive, in response to said control signal; and a converting circuit that converts said selected serial data into parallel Run Length Limited encoded data.

7. A disc drive controller according to claim 6 wherein said write bypass circuit comprises:

a converting circuit that converts said binary coded parallel data from said buffer circuit into serial binary encoded data; and a selection circuit that selects said serial binary encoded data from said converting circuit.

8. A disc drive controller according to claim 4, wherein said write circuit further comprises:

a clock providing circuit that provides a first write clock signal;

a divider circuit that produces a second write clock signal from said first write clock signal according to a predetermined frequency; and a clock selector circuit that selects one from said first and second write clock signals and provides said selected signal to said second encoding circuit.

9. A disc drive controller according to claim 8, wherein said first and second write clock signals control the cycle of said write circuit.

10. A disc drive controller according to claim 9, wherein said write circuit further comprises a counting circuit to count the pulses of said first and second write clock signals, and a write load signal generating circuit controlled by said counting circuit for outputting a load signal to said serial converting circuit enabling said serial converting circuit to load binary data from said buffer circuit.

11. A disc drive controller for controlling the access of data provided between a disc drive and said controller, said disc drive controller comprising:

a buffer circuit to buffer the data accessed between said disc drive and said controller;

a write circuit, coupled between said buffer circuit and said disc drive to provide data to said disc drive, said write circuit further comprising a modulation circuit to modulate the data provided to said disc drive, and a write bypass circuit to provide data to said disc drive without being modulated;

a read circuit coupled between said buffer circuit and said disc drive to read the data provided by said disc drive and to provide said read data to said buffer circuit, said read circuit further comprising a demodulation circuit to demodulate the data read from said disc drive; and a defect detecting circuit to detect the occurrence of a defect in said read circuit by comparing data which has been provided to said disc drive by said write bypass circuit and demodulated by said read circuit with a predetermined value.

12. A disc drive controller according to claim 11, wherein said write circuit receives parallel data from said buffer circuit and provides one of modulated serial data and write bypass serial data to said disc drive, said modulated data being modulated with a Run Length Limited code and a synchronized pattern, and wherein said demodulation circuit demodulates data containing a Run Length Limited code and a synchronized pattern.

13. A disc drive controller according to claim 12 wherein said read circuit comprises:

a control signal generator for generating a control signal;

a selection circuit that selectively supplies serial Run Length Limited encoded data provided from said disc drive, in response to said control signal, wherein said read circuit provides one of the demodulated parallel data and unmodulated parallel data to said buffer circuit.

14. A disc drive controller according to claim 12, wherein said write circuit further comprises:

a serial converting circuit that converts binary coded parallel data to serial binary coded data;

a first encoding circuit that encodes said serial binary data, provided by said serial converting circuit, with a Run Length Limited code; and a second encoding circuit that adds a synchronized pattern to said serial Run Length Limited encoded data, in accordance with a predetermined frequency; and a selection circuit that selects one from said serial binary coded data and serial data encoded with both of said Run Length Limited code and said synchronized pattern for output to said disc drive.

15. A disc drive controller according to claim 11, wherein said demodulation circuit further includes:

a read clock generating circuit for generating a first and second read clock signals, said second signal being divided by said first signal according to a predetermined frequency;

a control signal generator for generating a control signal;

a first converting circuit that converts serial Run Length Limited encoded data read from said disc drive into parallel Run Length Limited encoded data;

a decoding circuit, coupled to said first converting circuit, which converts the parallel Run Length Limited encoded data provided by said first converting circuit into binary coded serial data;

a second converting circuit that converts serial data provided by said decoding circuit into parallel data;

a data shifting circuit that eliminates a portion of said parallel data provided by said second converting circuit in response to said first and second read clock signals and said control signal provided by said control signal generator.

16. A disc drive controller according to claim 14, wherein said write circuit further comprises:

a write clock providing circuit that provides a first write clock signal;

a divider circuit that produces a second write clock signal from said first write clock signal according to a predetermined frequency; and a write clock selector circuit that selects one from said first and second write clock signals and that provides said selected signal to said second encoding circuit.

17. A disc drive controller according to claim 16, wherein said first and second write clock signals control the cycle of said write circuit.

18. A disc drive controller according to claim 17, wherein said write circuit further comprises a counting circuit to count the pulses of said first and second write clock signals, and a write load signal generating circuit controlled by said counting circuit that outputs a load signal to said serial converting circuit to enable said serial converting circuit to load binary data from said buffer circuit.

19. A disc drive controller according to claim 15, wherein said read circuit further comprises:

a signal providing circuit that provides a first read clock signal;

a divider circuit that produces a second read clock signal from said first read clock signal according to a predetermined frequency; and a signal selector circuit that selects one from said first and second read clock signals and that provides said selected signal to said second converting circuit.

20. A disc drive controller according to claim 19, wherein said first and second read clock signals control the cycle of said read circuit.

21. A disc drive controller according to claim 20, wherein said read circuit further comprises a second counting circuit to count the pulses of said first and second read clock signals, and said data shifting circuit controlled by said second counting circuit that outputs a load signal to said buffer circuit enabling said buffer circuit to load binary data from said second converting circuit.

22. A disc drive controller for controlling the access of data provided between a disc drive and said controller, said disc drive controller comprising:

a buffer circuit to buffer the data accessed between said disc drive and said controller;

a write circuit, communicatively coupled between said buffer circuit and said disc drive, wherein said write circuit provides serial data from said buffer circuit as parallel data to said disc drive, said write circuit operates in one of a modulated mode and a write-bypass mode to provide parallel modulated data and parallel unmodulated data, respectively;

a read circuit communicatively coupled between said buffer circuit and said disc drive wherein one of said parallel modulated and write-bypass data provided to said disc drive by said write circuit is read by said read circuit and provided as serial data to said buffer circuit said read circuit operates in one of a demodulated mode and a read-bypass mode to provide said read-out serial data as demodulated data and as data without being demodulated respectively; and a defect detecting circuit to detect the occurrence of a defect in one of said write and read circuits, wherein said defect detecting circuit determines said write circuit is defective by comparing modulated dam provided to said disc drive by said write circuit and read by said read circuit according to the read-bypass mode with a predetermined value, and wherein said defect detecting circuit determines said read circuit is defective by determining whether write-bypass data provided to said disc drive by said write circuit can be demodulated by said read circuit.

23. A disc drive controller according to claim 22, wherein said write circuit modulates data provided by said buffer circuit to contain Run Length Limited code and a synchronized pattern by a code modulating circuit, wherein data written according to said write-bypass mode bypasses said modulating circuit, wherein said read circuit demodulates data provided by said disc drive to eliminate said Run Length Limited code and said synchronized pattern by a code demodulating circuit, and wherein said data read in said read-bypass mode bypasses said demodulation circuit.

24. A disc drive controller according to claim 22 wherein said modulation circuit modulates serial data to contain a Run Length Limited code and a synchronized pattern, and wherein said demodulation circuit demodulates data in order to eliminate a Run Length Limited code and a synchronized pattern from the data read by said read circuit.

25. A disc drive controller according to claim 22, wherein said defect detecting circuit further includes a read bypass circuit and a write bypass circuit, said read bypass circuit operating to read bypassed data containing Run Length Limited code and a synchronized pattern from said disc drive and writes the bypassed data to said buffer circuit, said write bypass circuit operating to receive data provided from said buffer circuit and to provide the bypassed data to said disc drive.

26. A disc drive controller according to claim 24 wherein said modulation circuit further comprises:
   a serial converting circuit that converts binary coded parallel data to serial binary coded data;
   an first encoding circuit that encodes said serial binary coded data, provided by said serial converting circuit, with a Run Length Limited code; and
   a second encoding circuit that adds a synchronized pattern to said Run Length Limited encoded data, provided by said encoding circuit, in accordance with a predetermined frequency, said write circuit operating to provide data modulated by said converting circuit, said first and second encoding circuits.

27. A disc drive controller according to claim 24 wherein said demodulation circuit further includes:
   a first read clock generating circuit for providing a first read clock signal;
   a clock divider circuit for providing a second read clock signal from said first read signal according to a predetermined frequency;
   a control signal generator for generating a control signal;
   a first converting circuit that converts serial Run Length Limited encoded data read from said disc drive into parallel Run Length Limited encoded data;
   a decoding circuit, coupled to said first converting circuit, that converts the parallel Run Length Limited encoded data provided by said first converting circuit into binary coded serial data;
   a second converting circuit, coupled to said decoding circuit, that converts serial data provided by said decoding circuit into parallel data;
   a data shifting circuit, coupled to said converting circuit, that eliminates a portion of said parallel data provided by said second converting circuit in response to said third, fourth and control signals provided by said control signal generator.

28. A disc drive controller according to claim 25 wherein said read bypass circuit comprises:
   a control signal generator for generating a control signal;
   a selection circuit that selectively supplies serial Run Length Limited encoded data provided from said disc drive, in response to said control signal; and
   a converting circuit that converts said selected serial data into parallel Run Length Limited encoded data.

29. A disc drive controller according to claim 28 wherein said write bypass circuit comprises:
   a converting circuit that converts said binary coded parallel data from said buffer circuit into serial binary encoded data; and
   a selection circuit that selects said serial binary encoded data from said converting circuit.

30. A disc drive controller according to claim 26, wherein said write circuit further comprises:
   a clock providing circuit that provides a first write clock signal;
   a divider circuit that produces a second write clock signal from said first write clock signal according to a predetermined frequency; and
   a clock selector circuit that selects one from said first and second write clock signals and provides said selected signal to said second encoding circuit.

31. A disc drive controller for controlling the transfer of data provided between a computer and a disc drive coupled to said computer, said disc drive controller comprising:
   a buffer circuit to buffer the data accessed between said disc drive and said controller;
   a signal providing circuit that provides a control signal to said buffer circuit;
   a memory device, coupled to said buffer circuit, that stores data;
   a write circuit, communicatively coupled between said buffer circuit and said disc drive wherein said write circuit provides serial data from said buffer circuit as parallel data to said disc drive in one of a modulated mode and a write-bypass mode;
   a read circuit communicatively coupled between said buffer circuit and said disc drive wherein one of said parallel modulated and write-bypass data provided to said disc drive by said write circuit is read by said read circuit and provided as serial data to said buffer circuit in one of a demodulated mode and a read-bypass mode; and
   a defect detecting circuit to detect the occurrence of a defect in one of said write and read circuits in response to said control signal, wherein said defect detecting circuit determines said write circuit is defective by comparing modulated data provided to said disc drive by said write circuit when said write circuit is in said modulated mode and read by said read circuit according to the read-bypass mode with a predetermined value, and wherein said defect detecting circuit determines said read circuit is defective by determining whether write-bypass data provided to said disc drive by said write circuit when said write circuit is said write bypass mode can be demodulated by said read circuit.

* * * * *

UNITED STATES PATENT AND TRADEMARK OFFICE
CERTIFICATE OF CORRECTION

PATENT NO. : 5,479,651
DATED : December 26, 1995
INVENTOR(S) : Yukimi NAKAGUCHI

It is certified that error appears in the above-indentified patent and that said Letters Patent is hereby corrected as shown below:

Column 3, line 66, delete "/".

Column 5, line 51, delete "for" (second occurrence).

Column 8, line 7, after "to" insert --in--; and line 44, delete "a".

Column 10, line 27, change "0+" to --0--.

Column 12, line 40, change "start" to --starts--.

Column 13, delete the spaces between lines 55 and 56.

UNITED STATES PATENT AND TRADEMARK OFFICE
CERTIFICATE OF CORRECTION

PATENT NO. : 5,479,651
DATED : December 26, 1995
INVENTOR(S) : Yukimi NAKAGUCHI

It is certified that error appears in the above-indentified patent and that said Letters Patent is hereby corrected as shown below:

Column 14, line 53, delete "a" and insert —arre—

Column 19, line 4, delete "dam" and insert —data—.

Signed and Sealed this

Seventh Day of May, 1996

Attest:

BRUCE LEHMAN

Attesting Officer    Commissioner of Patents and Trademarks